(12) United States Patent
Afshari

(10) Patent No.: US 12,197,028 B2
(45) Date of Patent: Jan. 14, 2025

(54) OPTICAL CAGE SYSTEM

(71) Applicant: Ali Reza Afshari, San Jose, CA (US)

(72) Inventor: Ali Reza Afshari, San Jose, CA (US)

(*) Notice: Subject to any disclaimer, the term of this patent is extended or adjusted under 35 U.S.C. 154(b) by 594 days.

(21) Appl. No.: 17/435,989

(22) PCT Filed: Mar. 6, 2019

(86) PCT No.: PCT/US2019/020863
§ 371 (c)(1),
(2) Date: Sep. 2, 2021

(87) PCT Pub. No.: WO2020/180307
PCT Pub. Date: Sep. 10, 2020

(65) Prior Publication Data
US 2022/0099907 A1   Mar. 31, 2022

(51) Int. Cl.
*G02B 7/02* (2021.01)
(52) U.S. Cl.
CPC ...................................... *G02B 7/02* (2013.01)
(58) Field of Classification Search
CPC ........................... G02B 7/00–40; G01M 11/04
See application file for complete search history.

(56) References Cited

U.S. PATENT DOCUMENTS

| 3,945,600 A * | 3/1976 | Mallwitz | ................ | F16M 11/22 |
| | | | | 403/177 |
| 5,035,333 A | 7/1991 | Klingner | | |
| 5,828,502 A | 10/1998 | Afshari | | |
| 2017/0082820 A1 * | 3/2017 | Jin | .......................... | G02B 7/023 |
| 2017/0191611 A1 | 7/2017 | Nguyen et al. | | |

FOREIGN PATENT DOCUMENTS

| CH | 465328 A | * | 11/1968 | | |
| DE | 2636657 A1 | * | 2/1978 | | |
| GB | 2360841 A | | 10/2001 | | |
| WO | WO-9610204 A1 | * | 4/1996 | ............ | G01M 11/04 |
| WO | 2015144013 A1 | | 10/2015 | | |

OTHER PUBLICATIONS

Extended European Search Report mailed on Oct. 4, 2022 in corresponding European Patent Application 19918334.4.
"The LINOS Microbench", Jun. 14, 2012 (Jun. 14, 2012), XP055119631, Retrieved from the Internet: URL:https://www.qioptiq-shop.com/out/pictures/wysiwigpro/12-13_englisch/01_Microbench.pdf [retrieved on May 22, 2014].
Chinese Office Action mailed on May 29, 2023 in corresponding CN Application No. 201980096202.1.

* cited by examiner

*Primary Examiner* — Christopher Stanford
(74) *Attorney, Agent, or Firm* — Young Basile Hanlon & MacFarlane, P.C.

(57) ABSTRACT

An optical cage system that provides a plurality of optical components that may be assembled so as to construct a multiplicity of optical instruments in many varied configurations. Varied, polygonal, and circular optical mounting plates, and rods facilitate manipulation of the optical axis in a given system so as to reach a desired resulting optical instrument. Structural members provide stability and facilitate connectability.

20 Claims, 12 Drawing Sheets

OPTICAL CAGE SYSTEM

TECHNICAL FIELD

This invention relates to optical cage system sets and includes a plurality of optical cage components in each set that may be used together to construct a multiplicity of opto-mechanical instruments.

BACKGROUND

An earlier invention AN OTPICAL BENCH SYSTEM by Ali Afshari was filed in 1994, via U.S. Pat. No. 5,828,502 in which the square shape of prior art was substituted with a round shape to increase its mounting possibilities, and to reduce manufacturing cost. Ever since its filing, several concepts have been patented. The first product of this kind was offered by Spindler & Hoyer GmbH in 1970's which is described in the German Offenlegungsschrift 26 36 657 (DE 2636657 A1) filed on Aug. 14, 1976, and U.S. Pat. No. 3,945,600 filed on Mar. 23, 1976. In 2636657, its elements include optical mounts which are implemented as Square plates having perforations through which rods may extend at each corner. The optical mounts provided a relatively large opening in which optical elements Such as lenses, mirrors, gratings and the like can be positioned at the center thereof. Pins are provided for the purpose of Securing the optical mounts to the rods at their ends. The plates are clamped together at right angles by means of corner connectors and Separate pins. Although this apparatus and method for assembly is effective for rough, temporary Set-up, Sufficient rigidity is not maintained for precise optical alignment and additionally, the Square shape of the plates limited the number of configurations in which the plates could be assembled. The prior art also includes U.S. Pat. No. 5,035,333 to Hartmut Klingner for ARRANGEMENT FOR CONSTRUCTING A MICRO-OPTIC BENCH issued Jul. 30, 1991, and reference patents and documents cited therein.

The device described in the Klingner patent provides mounts for holding optical elements that preferably are manufactured out of injection-molded plastic. The perforations through the mounts have elevations that establish this Snap-together fastening facility. Although this System does not require Set Screws and is inexpensive to manufacture, it must be fabricated out of plastic and it does not offer any Solution for mounting the plates together. Of lesser import but still of interest are two Swiss patents numbered 340675 and 465238 provided herewith as being of interest in the general field. More recently, Newport's WO 2,015,187,184 A1 filed on Dec. 15, 2015 offers quick adding of optical plates without the need to remove support rods employed in prior art, and their US 20,160,187,609 A1 filed on Jun. 30, 2016 offers one rod support. The current invention would not only allow one-rod support, but any additional 2-3 or 4 rods support. Other innovations include a UK patent GB 2,360,841 A, that involves quick snap arms to a central block, and WO 2,002,077,600 A1 by Melles Griot that emphasizes on more elaborate cubic modules that can be bolted together for housing optical components. Another invention is described in Russian patent RU 2,253,140 C2, which secures the rods in place via external pressure blocks but it is too complex to work with, requiring a separate clamping block for each rod. There is also U.S. Pat. No. 6,775,076 B2, for MICRO OPTICAL BENCH FOR MOUNTING PRECISION ALIGNED OPTICS which uses a cylindrical base to align various same diameter lens cells. U.S. Pat. No. 6,775,076 B2 suggests an enhanced bounding surface for the lens cells but it is not an adjustable mounting scheme that can be easily taken apart, and reassembled in an optics lab.

The fabrication of mounting plates in prior art utilizing insertion of rods onto mounting plates requires high tolerance through bores. Mounting plates are conventionally fastened together by means of screws, therefore, all four sides of the plates have to be provided with some threaded bores. Further, the plates are joined together by corner connectors which must have equal numbers of bores through which the screws are secured (German Offenlegungsschrift 26 36 657). The plates are, therefore, highly labor intensive to produce. The current invention utilizes side mounted rods that not only eliminate corner connectors, but can utilize Aluminum rods, which are advantageous for its light weight, cheaper cost, and it can be cut to size by the user. It should be especially noted that most of the effort made in prior art had been to allow continuous positioning of optical carriers along the rods. As it will be shown, the positional adjustment of optical elements can also be accomplished by sliding the lens cells within the mounts. This eliminates the need for continuous adjustment of mounting plates, and simplifies the prior art to current invention.

To this date, mounting plates employing through rod bores, have been produced out of solid Aluminum bar stock using a 5-axis CNC machine. During fabrication, all rod securing bores are first center drilled for precise locating, then pre drilled by a slightly smaller drill size than the rods, and precision bored by a reamer in order to guarantee their tight fit tolerances. The Stainless Steel rods, on the other hand, have to be centreless ground, and polished to achieve their critical diameter, and to allow smooth translation of optical mounting plates. Support rods must also be hardened so the clamping force by set screws would not produce any surface damage to the rods. Fabrication of parts for current innovation only requires a simple cut off from prefabricated extruded Aluminum bar, reducing its machining cost to less than half. Furthermore, the current mounting scheme uses Aluminum rods, requiring less precision, and lower cost.

The prior art devices presented, including those cited in the Klingner patent, and Newport are commendable and show a creative spirit for their times. The inventors and their inventions have contributed remarkably to the technology involved. However, these prior art structures do not include those combined elements of the instant invention that provide greater facility of use and ingenious arrangement of components that make the instant invention the high culmination in the art.

SUMMARY

Components in the field of optics are usually manufactured to Strict tolerances and meticulously positioned by means of precision threads and screws. These optical components must, in certain applications, operate with high precision, thus justifying the high fabrication costs that prohibit these devices from being used in applications in which less accuracy is required. The present invention is intended as a development of an arrangement or optical system Set that can be assembled as a high precision optical bench with maximum flexibility in both function and form. Through the advantages of the invention, it will be possible to construct a much wider range of optical setups than is possible with the use of conventional optical mounting plates with insertion rods. The corner concavities in the mounting plates are located so as to allow them to be manufactured by Aluminum extrusion process. This technique would substantially reduce the manufacturing cost of the components by simply cutting off its prefabricated contour, and to add a small number of threaded, and radial bores by a CNC machine to reach its intended form. Through use of Aluminum rods with matched hole pattern provided in mounting plates, mounts may be directly secured together at different angles and spacing without the use of corner connectors. Various opto-mechanical configurations such as microscopes, telescopes, and other optical instruments may be constructed at reduced cost. Thus the System Set can be employed in any application where high precision is a prerequisite and can be utilized in combinations with conventional optical elements. In accordance with the instant invention, optical mounting plates are provided by means of which a multiplicity of optical experiments and configurations may be assembled, verified and tested and otherwise examined at the pleasure of a user.

A significant feature of the present invention is placement of support rods farther from the center that was possible in prior art. This allows much larger optical elements to be held without obstruction. Direct mounting of rods with cap screws also permits thinner optical mounting plates than prior art, resulting in more compact optical assemblies. The result is easily removable Aluminum rods rather than much heavier stainless steel rods implemented in the past. A significantly more mechanical rigidity, and accuracy is achieved by drilling the mounting bores on the rods instead of on the mounting plates. This allows full size socket head cap screws to secure rods in place instead of tiny set screws. The current system would allow creating shapes, forms, and functionality of life size optical instruments, especially needed in microscopy, interferometry, and machine vision inspection systems.

Substantial savings in manufacturing costs of optical mounts means more availability of mounting hardware in optical labs. With higher priced optical mounts, end users piece together individual components down to smallest set screws to build their optical setups. Because of the low costs associated with current invention, optical instruments may be put together using pre assembled modules instead of individual components. An example will be given in constructing a lamp housing sub assembly, and integrating it with a complete microscope.

BRIEF DESCRIPTION OF THE DRAWINGS

Further advantages and features of the instant invention will be more fully apparent to those skilled in the art to which the invention pertains from the ensuing detailed description thereof, regarded in conjunction with the accompanying drawings wherein like reference numerals refer to like parts throughout and in which.

ABSTRACT OF THE DRAWING

Figure 1:
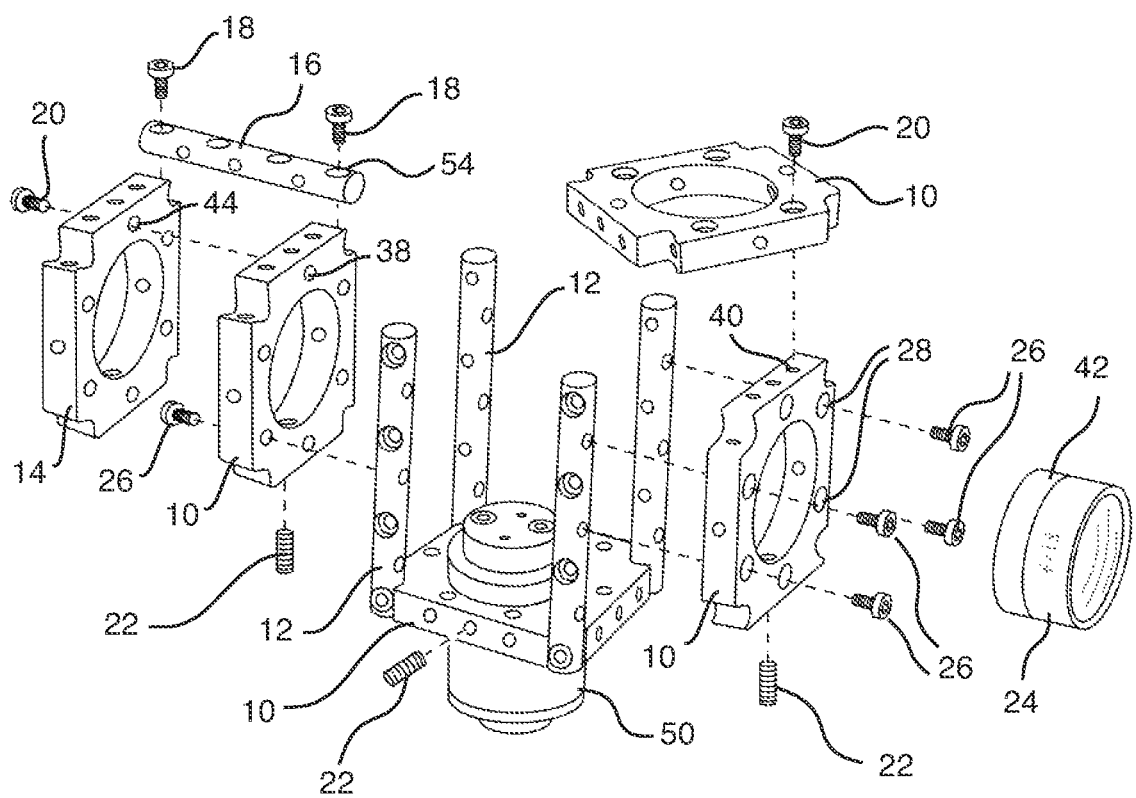
FIG. 1 is an exploded perspective view of an assembly in accordance with the invention.

In the drawings, the numerals refer to like parts throughout and, for purpose of explanation, set forth below are the numbered parts of the names of the elements of this invention.

| Identifying Numeral | Name of Element | Shown in FIGS. |
|---|---|---|
| 10 | Polygonal mounting plate adapted for securing outer mounting rods | 1, 7, 10, 23 |
| 12 | Set of plate securing rods | 1, 4, 7, 9, 10, 15, 21, 23 |

-continued

| Identifying Numeral | Name of Element | Shown in FIGS. |
|---|---|---|
| 14 | 2nd polygonal mounting plate adapted for securing outer mounting rods | 1, 3, 7, 23 |
| 16 | 2nd set of Plate Securing Rods | 1, 7 |
| 18 | Set of rod securing screws to plates | 1, 7, 15 |
| 20 | Set of plate securing screws to other plates | 1, 10 |
| 22 | Set of set screws to secure optical component 24 | 1 |
| 24 | Typical optical component mounted in cylindrical cell | 1, 10 |
| 26 | Set of plate securing screws to rods | 1, 7, 9 |
| 28 | Set of counter bored apertures adapted to secure plates to rods or other plates | 1, 2, 5, 11, 18 |
| 30 | Rod accepting concavities | 2, 3, 5, 6, 8, 9, 11, 13 |
| 32 | Rod securing threaded bores | 2, 3, 5, 6, 8 |
| 34 | Threaded apertures adapted to accept set screws to secure optical components | 2, 3, 5, 6, 8, 11, 18, 19 |
| 36 | Concentric circular bore to accept optical components | 2, 3, 5, 6, 8, 11, 18 |
| 38 | Set of threaded apertures adapted to secure two overlapped plates together | 2, 5, 11, 19 |
| 40 | Set of threaded apertures adapted to secure two plates together at right angles | 2, 3, 5, 6, 8, 11, 19, 22 |
| 42 | Typical optical component extension ring | 1 |
| 44 | 2nd set of counter bored apertures adapted to secure plates to rods or to other plates | 3, 8 |
| 46 | Equally spaced counter bored or threaded apertures having distance A | 3, 4, 13, 14 |
| 48 | Set of threaded apertures adapted to secure two overlapped plates together | 3, 6, 8, 9 |
| 50 | Typical Halogen lamp holder | 1, 10 |
| 52 | Equally spaced threaded apertures adapted to accept plate mounting screws | 4, 14 |
| 54 | Equally spaced counter bored apertures adapted to accept plate mounting screws | 4, 14 |
| 56 | 3rd polygonal mounting plate adapted for mounting orthogonally directed rods | 5 |
| 58 | Interface adapter to secure smaller mounts to larger mounts | 9, 10 |
| 60 | Threaded aperture adapted to accept rod securing screws | 9, 10 |
| 62 | Plate securing rod similar to 12 but bigger in diameter adapted to secure larger plates | 9, 10 |
| 64 | Counter-bored aperture to accept rod securing screws | 9 |
| 66 | Rod securing screw | 9, 10 |
| 68 | 2nd typical optical component mounted in cylindrical cell | 7, 10 |
| 70 | Typical adjustable flat mirror holder | 10 |
| 72 | Typical rectangular beam splitter mirror | 10 |
| 74 | Typical microscope objective turret mounting ring | 10 |
| 76 | Typical microscope objective | 10 |
| 78 | Typical microscope objective turret | 10 |
| 80 | 4th polygonal mounting plate adapted for mounting rods | 10 |
| 82 | Rod accepting concavities | 6 |
| 84 | 5th polygonal Mounting Plate for axial and orthogonal rod mounting | 6, 7, 22, 23 |
| 86 | Elongated rod securing concavity | 6, 22 |
| 87 | Third set of plate securing rods | 7, 15 |
| 88 | Rod securing concavities | 9 |
| 90 | 5th polygonal mounting plate with rod accepting concavities in radial direction | 11, 15 |
| 92 | 6th polygonal mounting plate adapted for 2-rod mounting | 8, 9 |
| 94 | Sliding connector | 23 |
| 95 | Optical axis of mounting plates | 9 |
| 96 | Threaded aperture adapted to accept plate mounting screws | 23 |
| 98 | Rod securing concavity | 23 |
| 100 | Slotted aperture adapted to accept rod securing screws | 23 |
| 102 | Rod securing threaded bore | 12 |
| 104 | 3-way rod joint connector | 12, 15 |
| 106 | Rod securing threaded bores | 12 |
| 108 | Rod accepting concavity | 12 |
| 110 | Elongated rod accepting concavity | 12 |
| 112 | Rod accepting concavity | 12 |
| 114 | Rod securing threaded bores | 13 |
| 116 | Rod accepting concavity | 13 |
| 118 | 4-way rod joint connector | 13 |
| 120 | Rod securing threaded bores | 13, 15 |
| 122 | 90 Degree curved assembly rod | 13 |
| 124 | 7th polygonal mounting plate adapted for mounting inner mounting rods | 14, 15 |
| 126 | Rod mounting screws accepting bores | 16, 20 |
| 128 | Rod accepting concavity | 16, 20 |
| 130 | Set of apertures adapted to secure two plates together | 16, 20 |
| 132 | Set of threaded apertures adapted to secure two plates together at right angles | 16, 20 |
| 134 | Threaded apertures adapted to accept set screws to secure optical components | 16, 20 |
| 136 | Concentric circular bore to accept optical components | 16, 20 |
| 138 | 8th polygonal Mounting Plate adapted for inner mounting rods | 17, 20, 21 |
| 140 | Set of threaded apertures adapted to secure two overlapped plates together | 17, 20 |
| 142 | Set of inner rod securing screws | 17 |
| 144 | Fixed support rods to secure optical cells | 17 |
| 146 | Rotating support rod to lock optical cells in place | 17 |
| 148 | Support rod 2nd threaded screw adapted to secure locking lever | 17 |
| 150 | Grooved cut along the length of rotating rod 146 | 17 |

-continued

| Identifying Numeral | Name of Element | Shown in FIGS. |
|---|---|---|
| 152 | Cylindrical rubber strand secured inside groove 150 | 17 |
| 154 | Support rod 146 rotation lever | 17 |
| 156 | Contact line between lens cell, and support rods | 17 |
| 158 | 9th circular mounting plate adapted to secure longitudinal mounting rods | 18 |
| 159 | Open apertures adapted to secure plates to rods or other plates via mounting screws | 18 |
| 160 | 10th polygonal mounting plate adapted for inner, and outer mounting rods | 19 |
| 162 | Rod mounting screws accepting bores | 19 |
| 164 | Extended rod securing screw | 9, 10, 21 |
| 166 | Extended rod securing screw for rod 62 | 21 |
| 170 | 11th polygonal mounting plate adapted for inner and outer mounting rods | 21 |
| 172 | Hinged connector | 22, 23 |
| 174 | Hinge connector pivot support | 22 |
| 176 | Hinge connector pivots | 22 |
| 178 | Mounting bore for hinge connector middle piece | 22 |
| 180 | Mounting bore to secure hinge connector outer pieces | 22 |
| 182 | Swivel arm | 22, 23 |
| 184 | Swivel arm guide slot | 22 |
| 186 | Swivel arm mounting bores | 22, 23 |
| 188 | Lock nut | 22 |
| 190 | Swivel arm lock screw | 22, 23 |
| 192 | Prism support | 22, 23 |
| 194 | Prism support threaded mounting bores | 23 |
| 196 | Equilateral prism | 23 |
| 198 | Prism support mounting bores | 22 |
| 200 | Locking nut for screw 166 | 21 |
| 202 | Locking nut for screw 18 | 23 |

DETAILED DESCRIPTION

Although specific embodiments of the invention will now be described with reference to the drawings, it should be understood that Such embodiments are by way of example only and merely illustrative of but a small number of the many possible Specific embodiments which can represent applications of the principles of the invention. Various changes and modifications, obvious to one skilled in the art to which the invention pertains, are deemed to be within the spirit. Scope and contemplation of the invention as further defined in the appended claims. Referring to the drawing and to FIGS. 2, 3, 5, 6, 8, 9, 11, 16, and 18 through 21 with greater particularity, optical mounting plate components of the Optical Bench System have been depicted.

Particularly noting FIG. 1 at this time, an exploded view of a typical configuration showing how a polygonal optical mounting plate 10, having a plate thickness dimension such that threaded bores 32 (FIG. 2) may be fabricated therein in orthogonal direction and having orthogonally directed rod accepting concavities 30 and plate retaining rods 12 fastened by mounting screws 18, may be fashioned. To make this example be of later use, FIG. 1 actually exhibits a lamp housing assembly, which will be later utilized in constructing a microscope.

Figure 4:
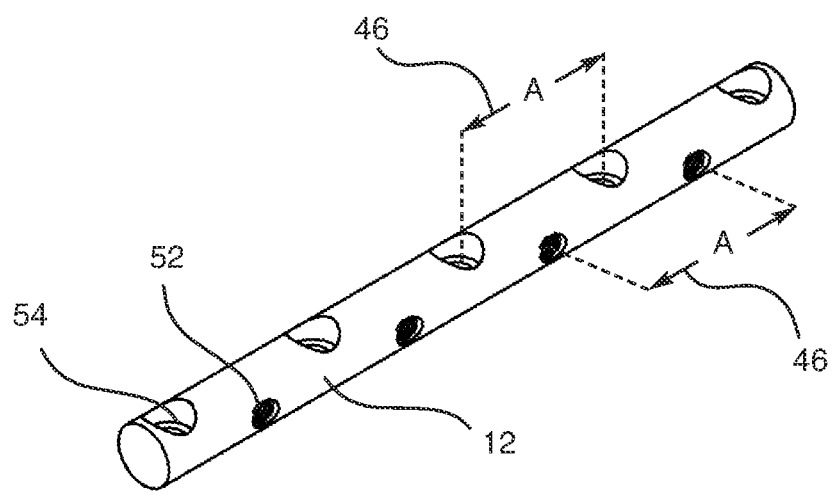
FIG. 4 is a detail perspective view of a typical connecting support rod.

Retaining rods 12, and 16 have two orthogonally fabricated bore patterns along their sides detailed in FIG. 4. The assembly in FIG. 1 illustrates how these rods according to the invention, essentially replace what is known as corner connectors in prior art: The counter-bored hole pattern of the rods may be utilized to connect two or more optical mounting plates 10 along the rods by means of fastening screws 18. The threaded bored side thereof, shown by rod 12, may also be utilized to secure plates 10 by means of a second set of fastening screws 26. An assorted range of rod lengths are to be fabricated such as 12, 16, and 87 with equally spaced hole pattern 46 (FIG. 4), to allow construction of multiplicity of setups. As it will be further shown, a curved rod shape or a rod that functions like a hinge may be fabricated to assemble countless number of optical setups.

Figure 2:
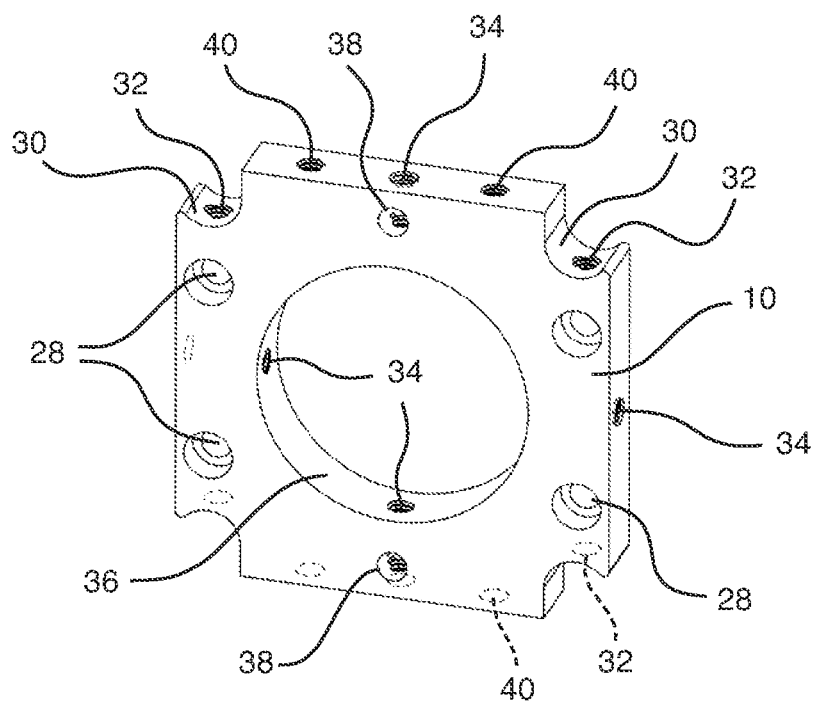
FIG. 2 is a detail perspective view of a typical specification of an optical mounting plate adapted for securing support rods in axial direction.

A typical optical component 24 may be mounted and secured within the concentric central bore of an optical mounting plate by means of set screws 22 along with Second threaded apertures or bores 34 as illustrated in FIG. 2. In greater particularity, FIG. 1 shows how four fundamental arrangements of optical mounting schemes may be performed in accordance with the invention. In a first configuration, a plurality of mounts 10 can be slid in between rods 16 and locked in position by means of fastening screws 18 through counter-bores 54. Thus any number of plates can be firmly fastened at any discrete point along the rods. In a Second configuration, a mounting plate 10 can be attached to the threaded sides of rods 12 by means of screws 26, through counter-bores 28. In a third construction, any two mounts 10 and 14 may be mated face to face by a pair of screws 20 through counter-bores 44 of mount 14, and threaded bores 38 of mount 10.

A fourth mounting is by securing two mounts at right angles through counter-bores 28 of mounting plate 10, and threaded bores 40 on the sides of mount 10 or 14. By replicating this assembly procedure at the sides of each plate, an entire cube may be constructed. A simple optical element 24 may be secured to a matching diameter extension ring 42, and translated within the mount as needed for focus adjustment. The lens cell 24 may be secured within the mounting plate by set screws 22 inserted through threaded bores 34 (FIGS. 2, and 3) and positioned so as to allow a user to focus the lens cell.

Figure 3:
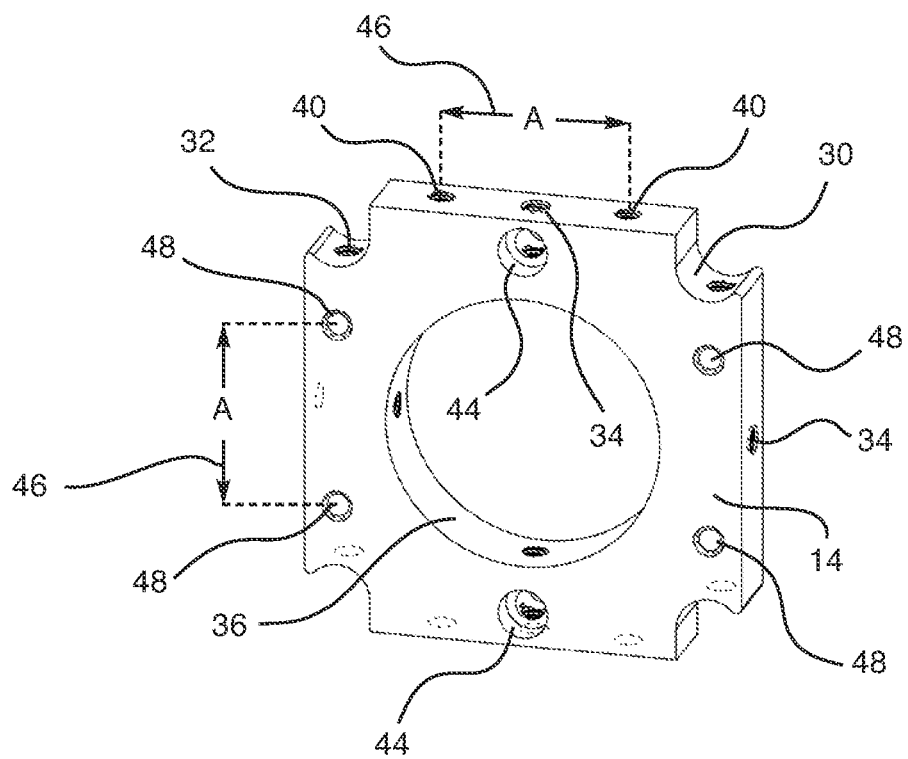
FIG. 3 is a perspective view of an alternative optical mounting plate that mates with the mount shown in FIG. 2.
Figure 18:
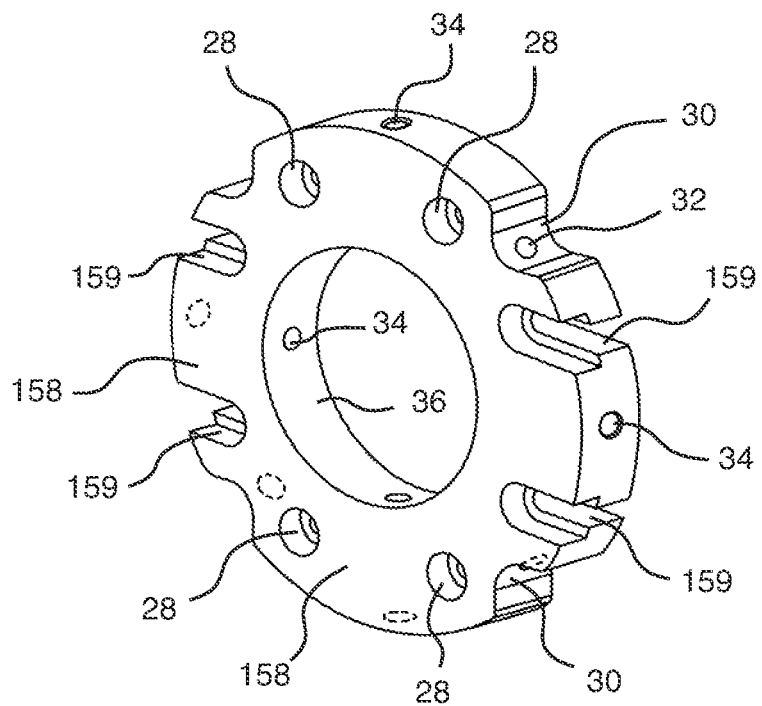
FIG. 18 is a detail perspective view of an alternate round optical mounting plate with rod securing screws in radial orientation, and its open aperture counter-bores.

FIG. 2 is a detail drawing showing a typical Specification of an optical mounting plate 10 in a set such as is described in FIG. 1, and FIG. 3 shows a like detail of an optical plate 14 such as has been shown in FIG. 1. The detailed aspect illustrated in both FIGS. 2 and 3, shows a polygonal outer boundary with rod securing concavities and a concentric central bore adapted for the mounting of optical elements, and defining a differential radial dimension having holes bored therein. An alternative circular form may be also considered as shown in FIG. 18. The hole pairs 28, 40, and 48 as shown in FIGS. 2, and 3 are adapted having equally spaced dimension A (46) to match the repeated hole pattern alongside support rods 12 (FIG. 4). The typical detailed illustrations shown in FIGS. 2, 3, and 4 are presented for illustrative purposes only and are not intended to limit the Scope, Spirit and contemplation of the invention.

Figure 5:
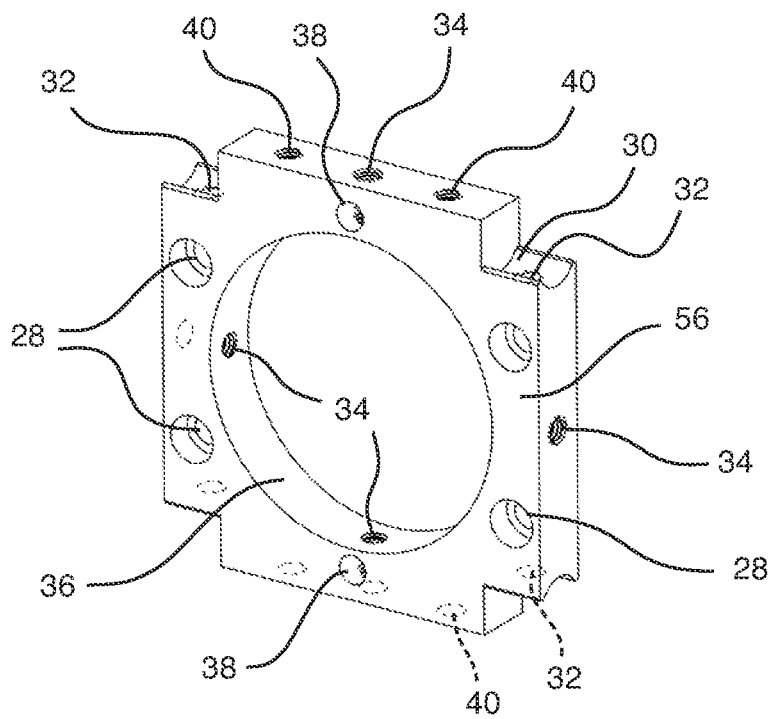
FIG. 5 is a perspective view of optical mounting plate adapted for securing support rods orthogonal to the optical axis.
Figure 6:
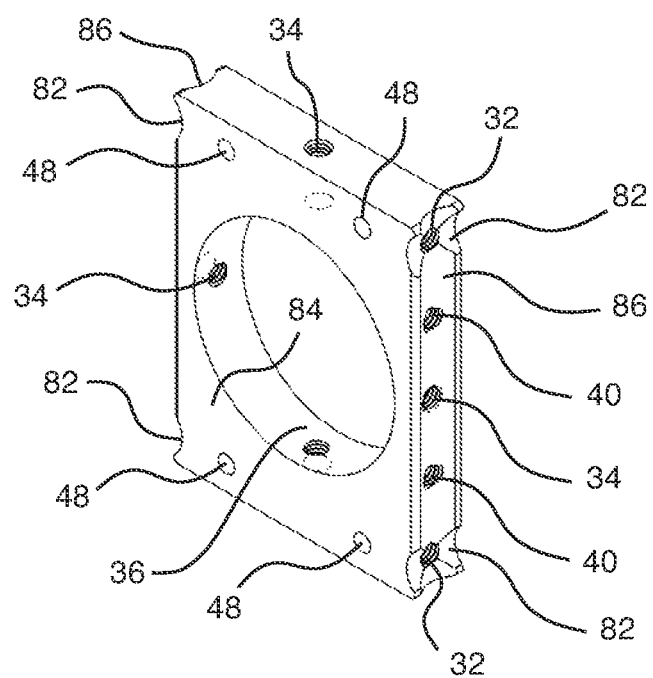
FIG. 6 is a detail perspective view of a specially modified optical mounting plate to accept rods in both axial and orthogonal directions.
Figure 7:
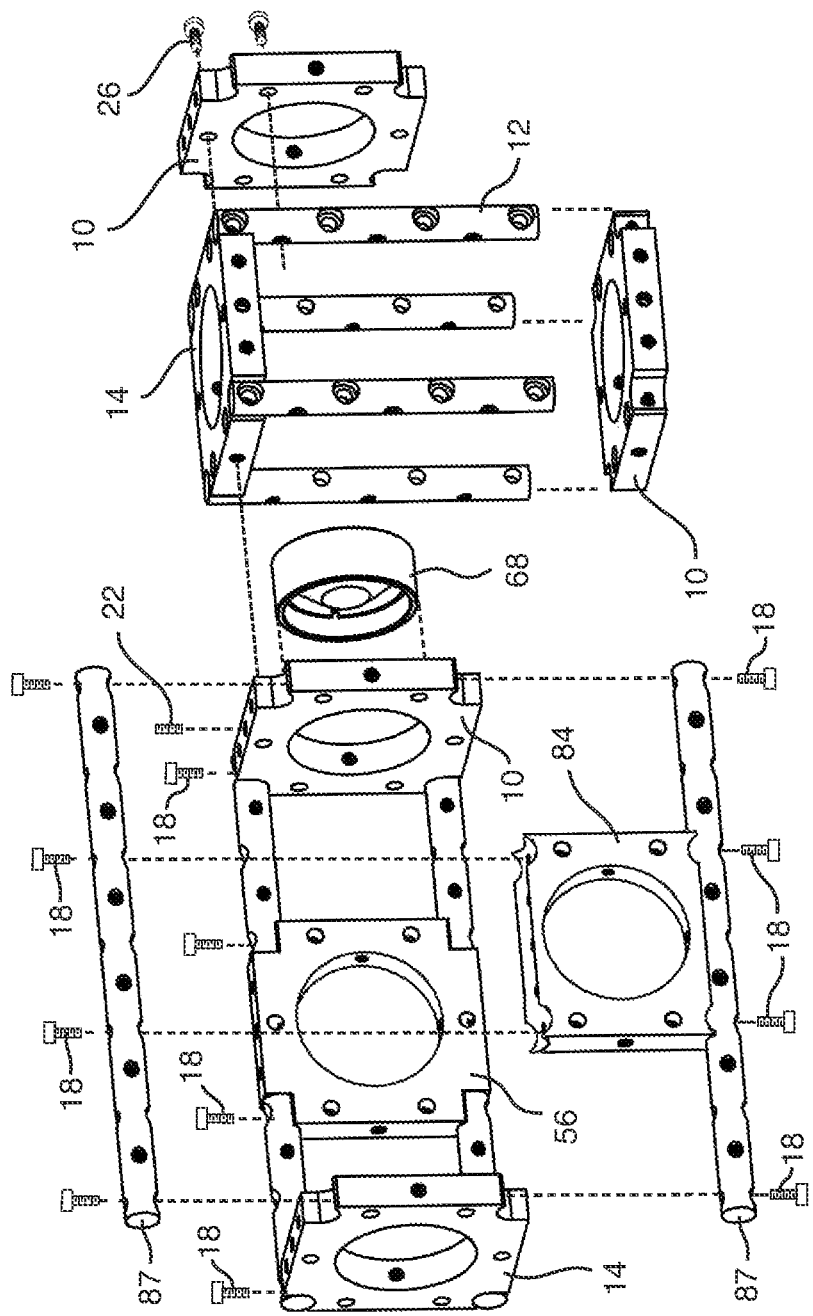
FIG. 7 is a perspective view exemplifying a typical assembly of various optical mounting plates shown in FIG. 2 through 6.

FIG. 5 shows a detailed view of mount 56, having rod accepting concavities parallel with its sides compared to the axial direction in standard mounting plates 10 and 14. FIG. 7 illustrates how the optical axis of mounts 10 and 14 along rods 87 is orthogonally attached to the optical axis of mount 56 along rods 12. Mount 56 is intended to be secured in-line with the rods as shown in FIG. 7, and may carry optical elements in orthogonal direction with the optical axis. A further modified mount 84 shown in FIG. 6, has elongated rod accepting concavities 86 running across its sides, while having additional concavities 82 to accept rods in the axial direction. The extended concavities of mount 86 would let it slide along any rods pairs 87, and be fastened at various positions as shown, via fastening screws 18.

Figure 8:
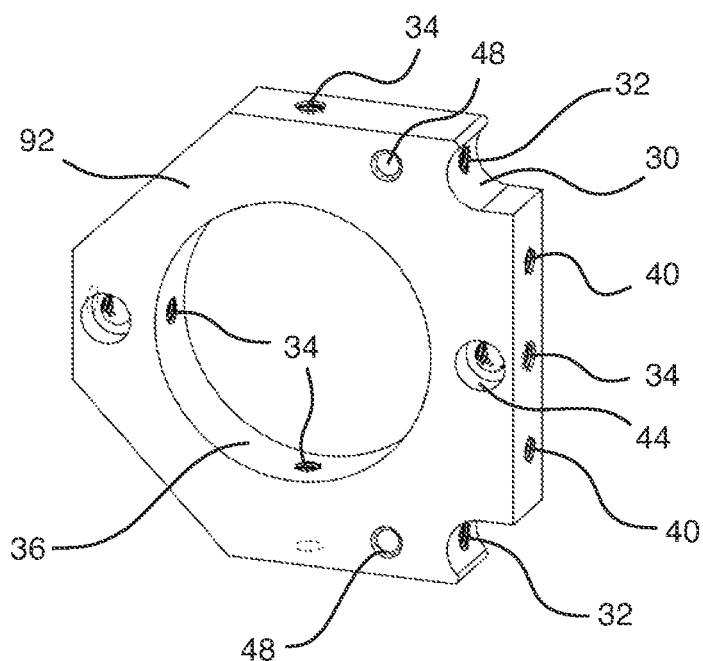
FIG. 8 is a detail perspective view of a specially modified optical mounting plate for mounting on two rods.
Figure 9:
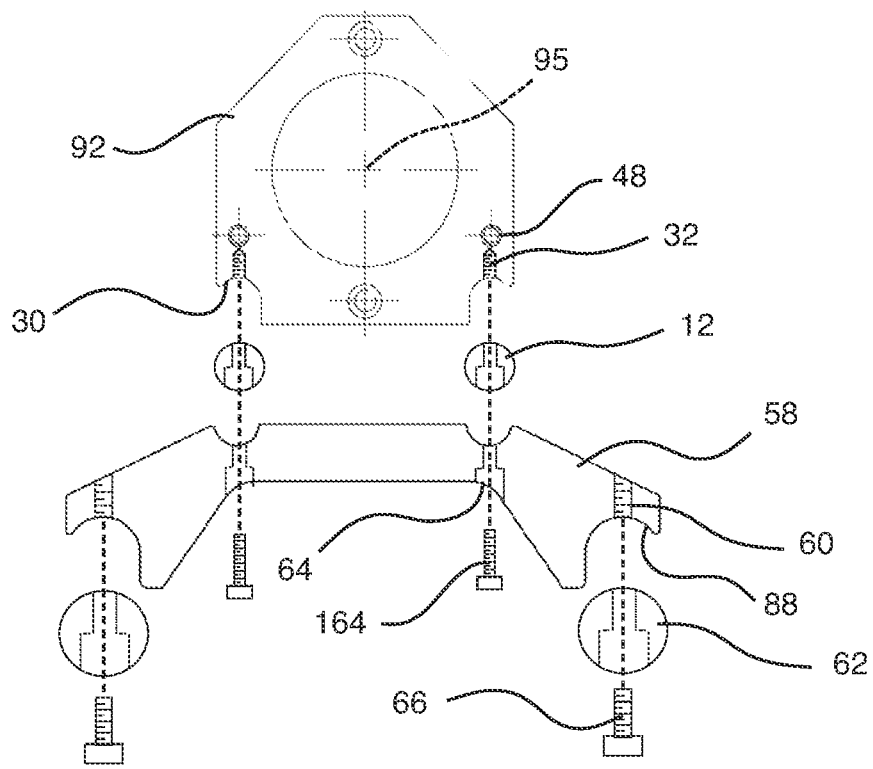
FIG. 9 is a plan view in cross section of a specially modified optical mounting plate to combine two sizes of optical mounting plates.

FIG. 8 shows mount 92 with two corners removed in the radial direction so it may be easily inserted into or removed from an assembly having 3 or 4 rods. It is important to note in every arrangement shown with the optical cage set, the optical axis always coincides with the axis of geometry of optical mounting plates. FIG. 9 shows how a smaller mount such as 92 is attached to a larger optical mounting plate 58 while sharing the same optical axis 95. Both rod accepting concavities 30 in mount 92 are placed on rods 12 and locked into position by fastening screws 164 onto threaded bores 32. Mount 58 in FIG. 9 is adapted to have both inside, and outside rod accepting concavities, allowing easy insertion and removal of mount 92, as well as said mounts 10, and 14 within a much larger mount 58 having larger diameter rods 62. Mounting plate 58 may be secured to mount 92, and rods 12 by means of screws 164 through counter-bores 64. Similar to mount 92, mount 58 also possesses the facility of being insertable into a four-rod system, brought into perfect alignment via its insertable concavities 88 (FIG. 9, 10). Rods 62 are attached to mount 58 via screws 66 fastened onto threaded bores 60.

Figure 10:
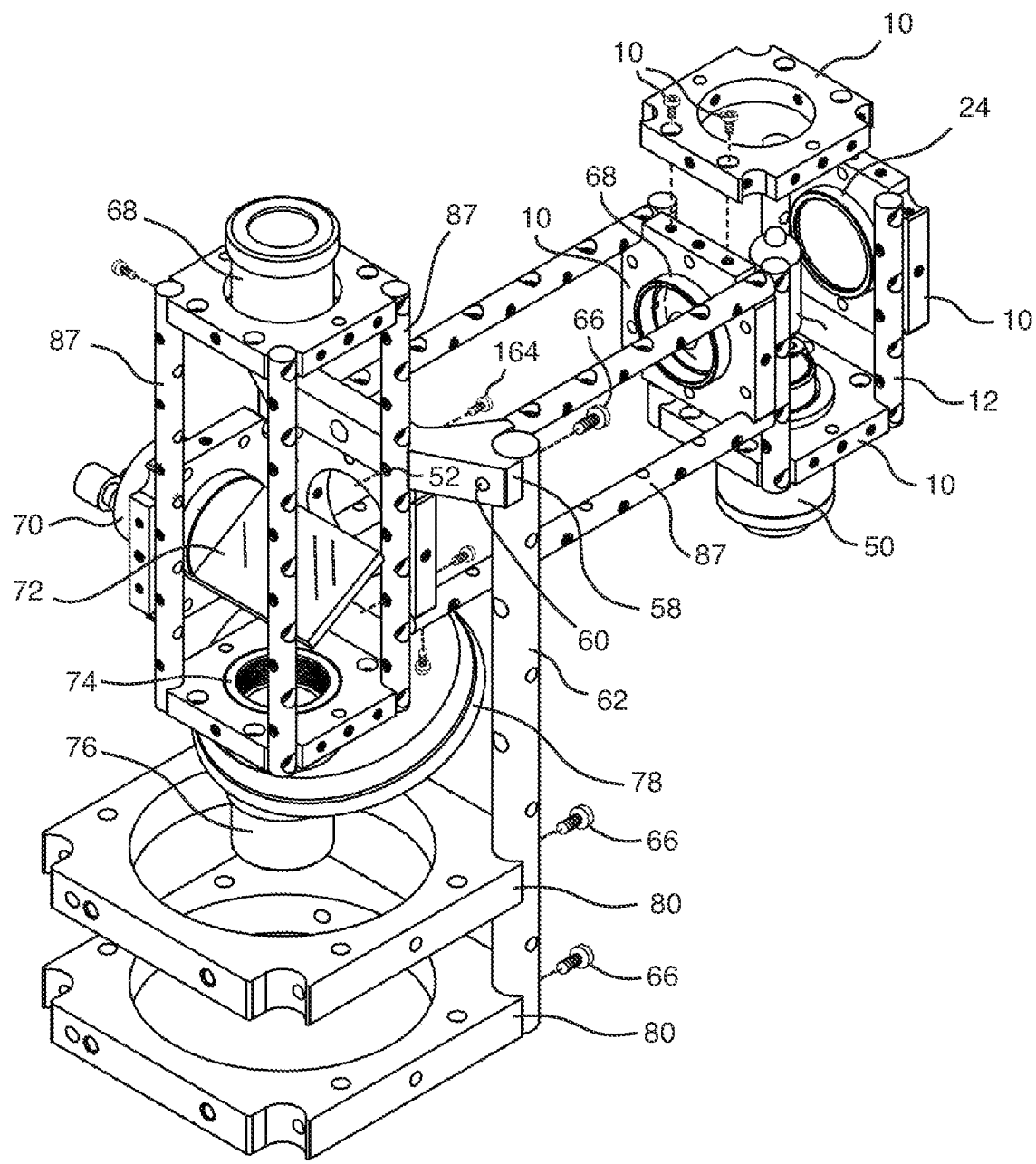
FIG. 10 is a perspective view showing the assembly of a typical optical microscope by combining various size mounting plates shown in FIG. 2 through 9.

FIG. 10 shows a typical optical microscope having a light source held by lamp holder 50, reflective mirror 24, and condenser lens 68. The collimated beam from condenser lens 68 is directed to a beamsplitter mirror 72 held by adjustable mirror mount 70, and is reflected to objective lens 76, held by objective turret 78. The light beam arrives at the sample held at the center of upper mount 80. The sample is magnified through the objective lens 76, and the light beam passes through beamsplitter mirror 72, to reach the eyepiece 68 for observation. The illumination assembly is detailed in FIG. 1 while a section view of the observation column is shown in FIG. 9. During experimentation, said mounting plates 92 may be inserted in between rods 87 to secure any additionally needed optical elements. As it can be seen in FIG. 10, mounting plate 58 is a modification of mount 80 with a major portion machined off. Mount 80 has four rod accepting concavities while mount 58 has only two. The front upper portion of the optical microscope shown is deliberately cleared from larger mounts 80 to allow easier access to the objective turret, and sample stage.

Figure 11:
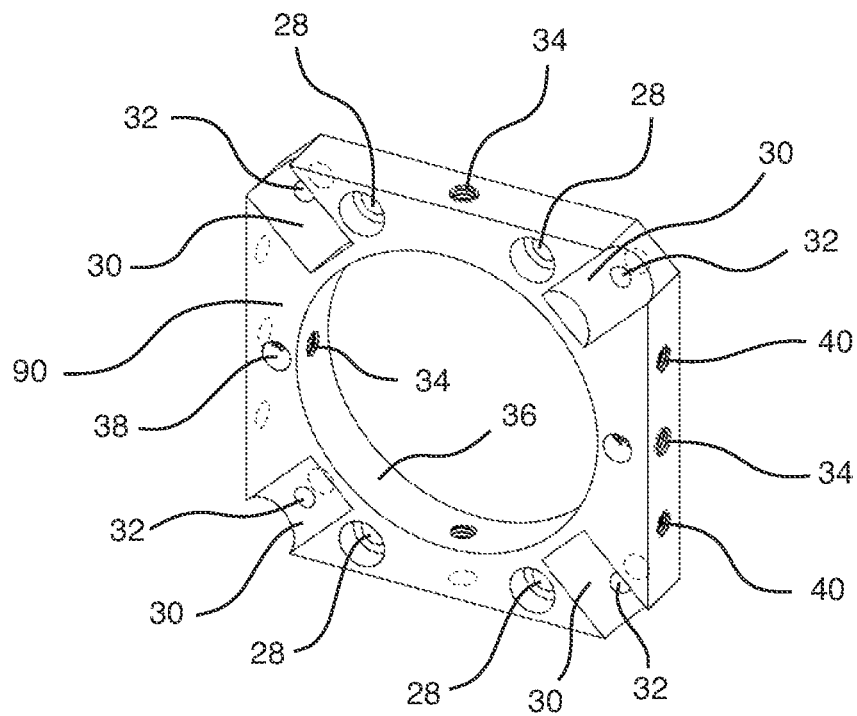
FIG. 11 is a detail perspective view of a specially modified optical mounting plate to secure the rods in radial direction.
Figures 12, 13:
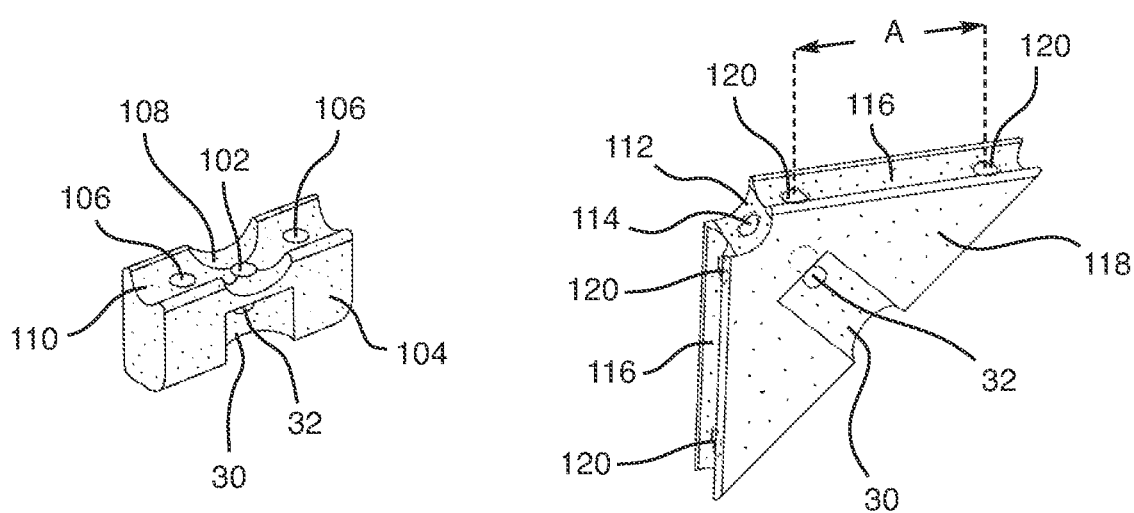
FIG. 12 is a perspective view exemplifying a 3-way corner connector.
FIG. 13 is a perspective view showing a 4-way corner connector.
Figure 14:
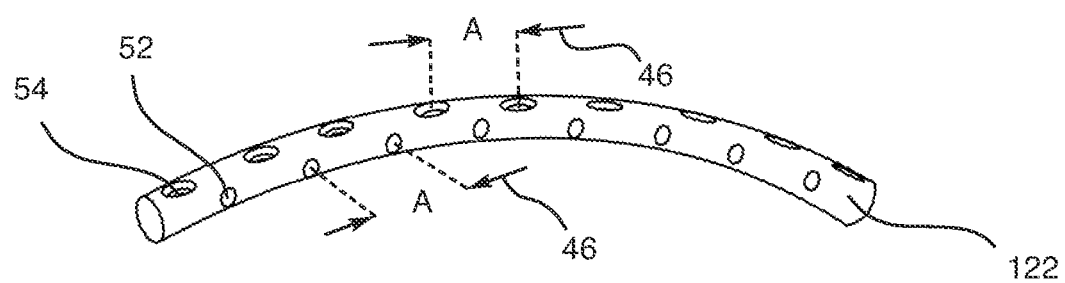
FIG. 14 is a perspective view of a curved connecting support rod.
Figure 15:
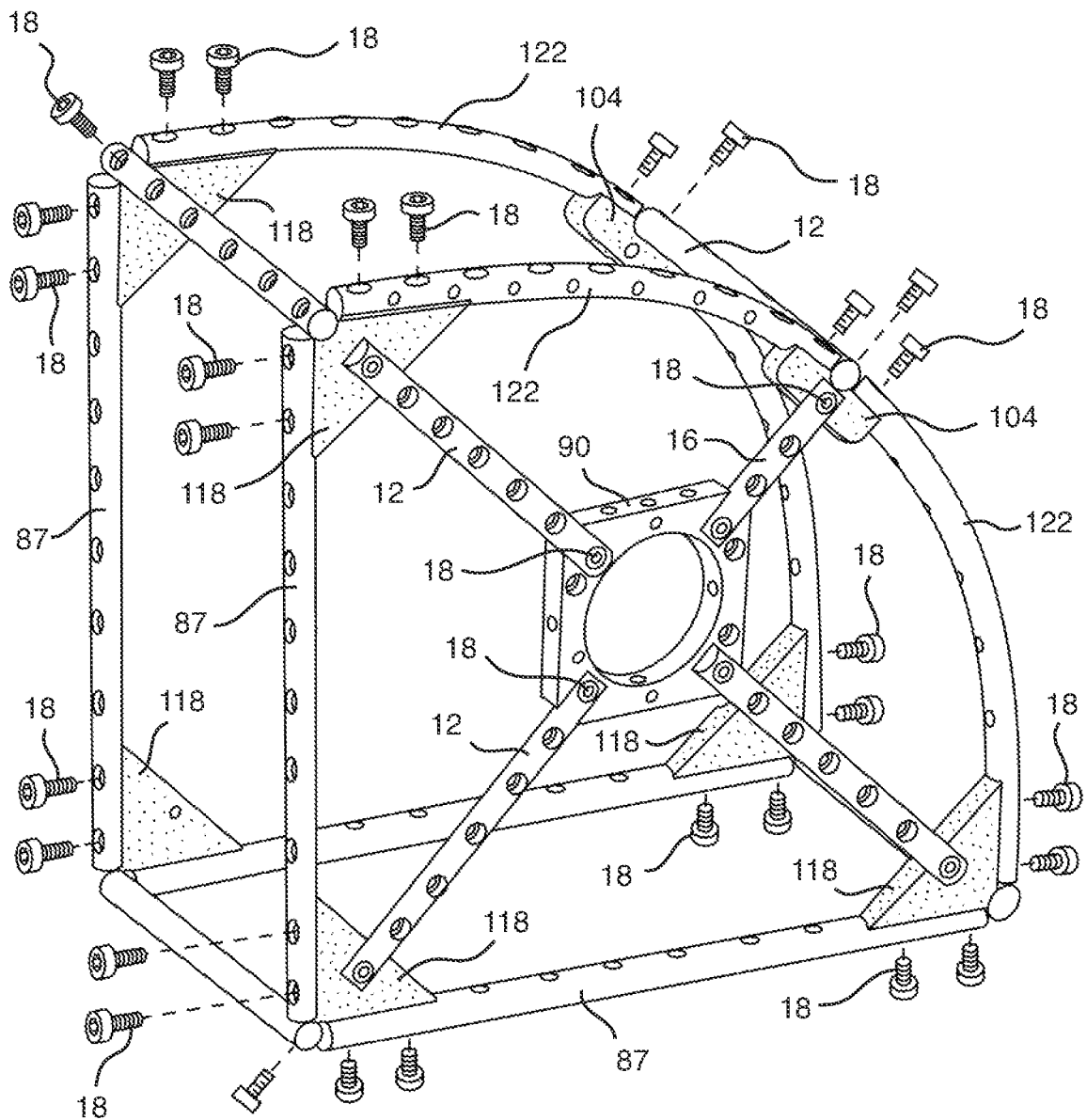
FIG. 15 is a perspective view showing a typical optical housing assembly constructed with corner connectors of FIGS. 12 and 13, and support rods in FIGS. 4, and 14.

FIG. 11 shows details of an optical mounting plate 90 having rod accepting concavities on its face to allow mounting of rods in diagonal direction. As shown in FIG. 15, the rods are secured to concavities 30 by fastening of screws 18 onto threaded bores 32. The purpose of this mount is to further facilitate construction of space frame structures often required in opto-mechanical assemblies. Of interest, corner connectors shown in FIGS. 12, and 13, and curved rod 122 in FIG. 14 are adapted to facilitate building such structures. Similar rod accepting concavities 110, 108, 112, 116, and 30 (FIGS. 12, and 13) are adapted in corner connectors 104, and 118 to secure rods at various angles, by securing said screws 18 onto threaded bores 102, 106, 114, 120, and 32. For example, to construct the cylindrical contours of a telescope, curved rods depicted in FIG. 14 can be utilized in combination with said corner connectors to construct multiplicity of structural space frames, shown in FIG. 15.

For generalization, many of the optical mounts in FIG. 15 have been removed plus all its internal optical elements, to only reveal its outer frame work. For example, the assembly shown in FIG. 15 may be configured to construct a desk-top biomedical analyzer instrument featuring a laser source, focusing optics, a sample holding device with a detector and a LCD (liquid Crystal Display) to display its test results. As illustrated in FIG. 15, corner connector 104 is utilized to construct a T joint. Furthermore, corner connector 118 may be utilized to allow joining of two rods to form a L joint, or three rods to form a corner cube, or four rods to form a corner cube with diagonal support. As the number of parts increase, so will be the complexity of the space frame structures, and proper bore spacing along the rods, and having sufficient range of rod lengths would be essential for constructing such assemblies in every possible way. This space frame structure offers enormous cost savings in development of current state of the art instrumentation in the field of microscopy, biomedical, and pharmaceutical technology since there are no low cost off the shelf solutions to create their functional package and form.

Figure 16:
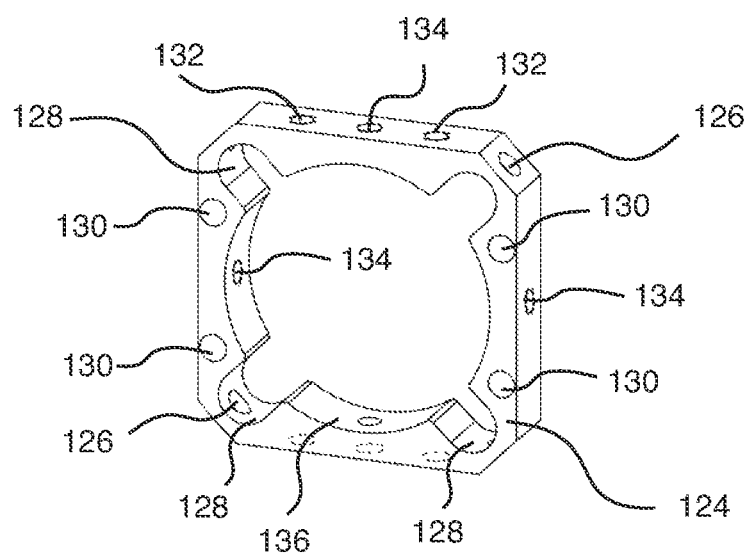
FIG. 16 is a detail perspective view of a typical specification of an optical mounting plate adapted for securing support rods internally.
Figure 17:
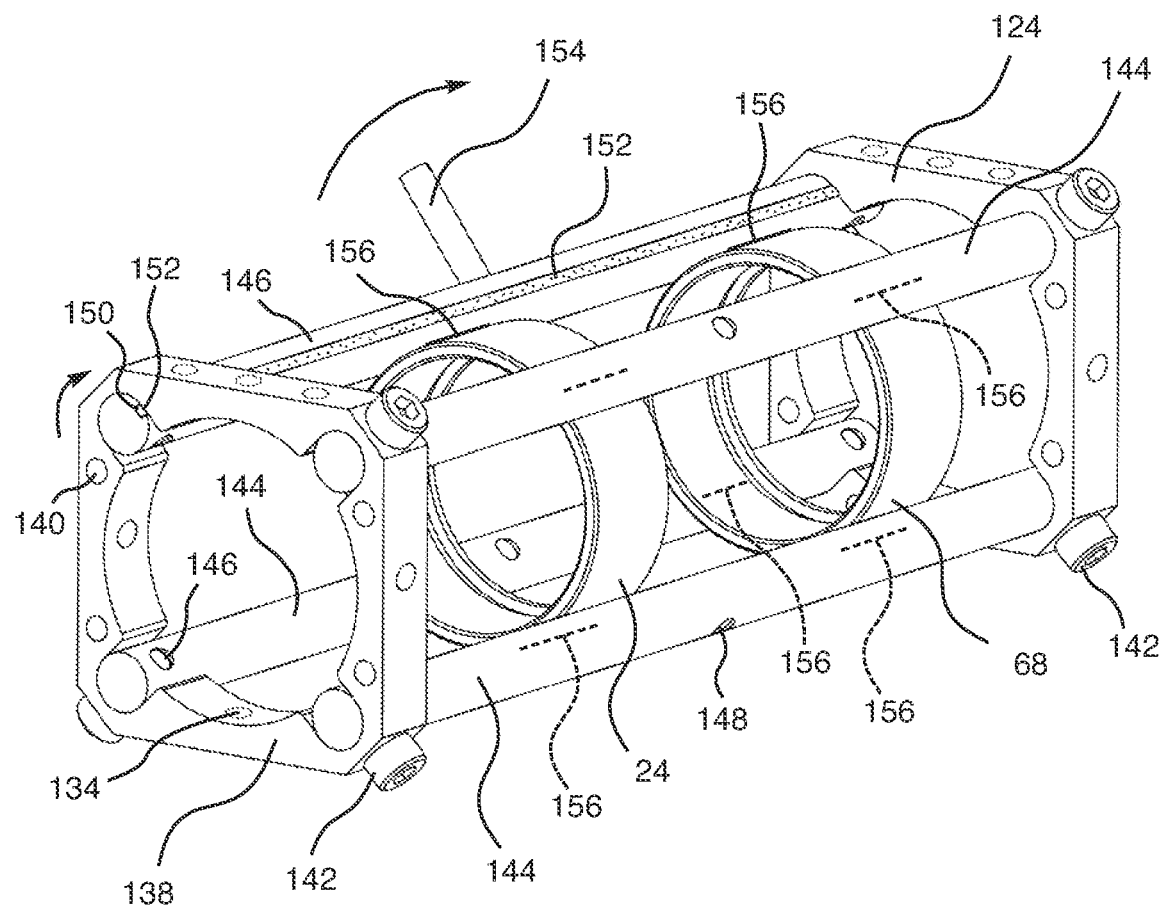
FIG. 17 is a perspective view illustrating the mounting of two optical lens cells within 4 rods.

FIG. 16 shows a detail perspective view of an optical mounting plate adapted for securing internal rods, and having rod accepting concavities in the axial direction. This mount is an inside out variation of said mounting plate 10 in FIG. 2 except the rod securing screws are oriented in radial direction. FIG. 17 illustrates a typical adaptation of mount 124 in an optical assembly. Similar to mount 10, a typical optical component 24 may be mounted and secured within the concentric central bore 136 of optical mounting plate 124 by means of set screws through threaded bores 134. The spacing between the four rods are such that the coincident line between the rods, and cylindrical lens cells may be employed to align, and then lock the elements in place anywhere along the rods. In arrangement shown in FIG. 17, three rods 144 are secured internal to the mounts 124 by screws 142, while one rod (146) is rotatable about its axis inside the 4th inner concavity 128. The lens cells 24, and 68 are being held by the rods at their lines of contact shown as visible, and dotted lines 156.

Figure 23:
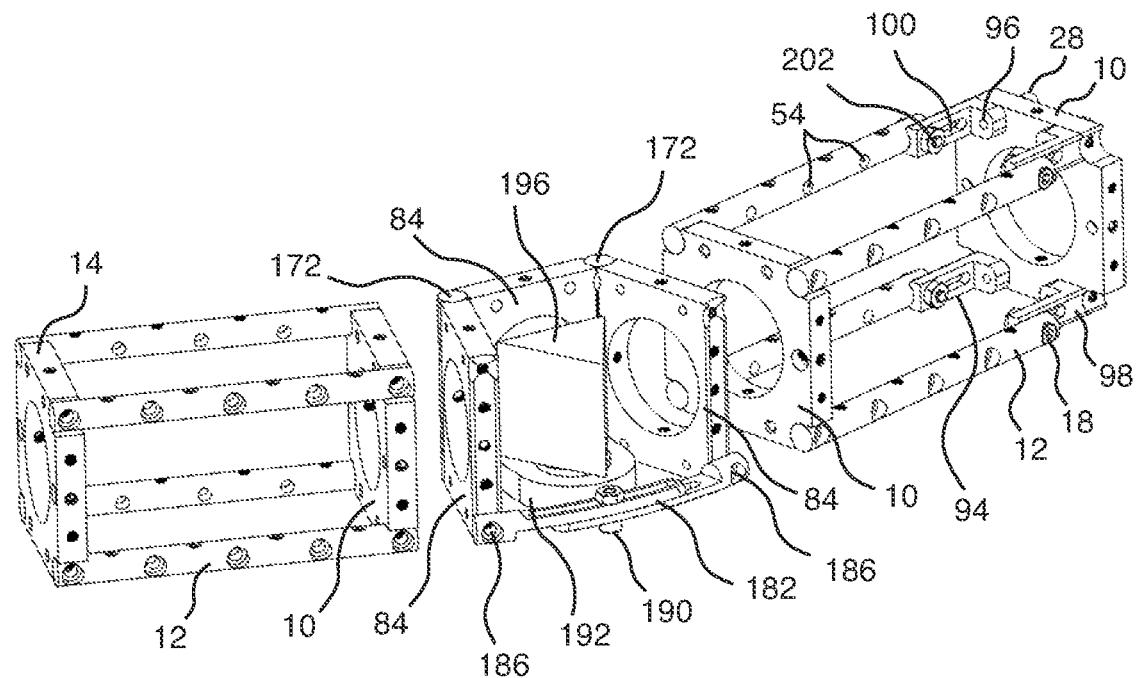
FIG. 23 is a perspective view showing the assembly of a typical prism spectroscope constructed with said hinged connector in FIG. 22.

In practice, only two of the rods would be in contact with the lens cells at a time. The rotary rod is equipped with a rubberized lining 152 that when turned into locked position by the aid of a locking handle 154, the rubberized lining pushes against each lens cell to lock them in position. The rubber lining is recessed half its diameter into slot 150, cut out along the length of rod 146 (FIG. 17). To release the lenses for repositioning, the lock lever 154 is turned counterclockwise, and the rubber lining is disengaged from the lens cells. Mounting plate 138 (FIG. 20) is an alternative form of mounting plate 124. These mounts are paired similar to said mounting plates 10, and 14 (FIGS. 2, and 3). By placing these mounts at opposite ends of optical assemblies (as in FIG. 17), two or more assemblies may be added to one another by simple mating of the two pairs against each other face to face. The mating plates are secured together by lining up their threaded bores 140, and counter-bores 130. An example of this face to face mounting of plates such as mount 10 and 84 is shown in FIG. 23.

FIG. 18 depicts an alternative circular form of optical mounting plate 158 with axially directed concavities having threaded rod securing bores 30. Open apertures 159 allow easy removal of plates without having to completely remove some of the mounting screws. Open apertures 159 also facilitate their low cost fabrication through Aluminum extrusion process.

Figure 19:
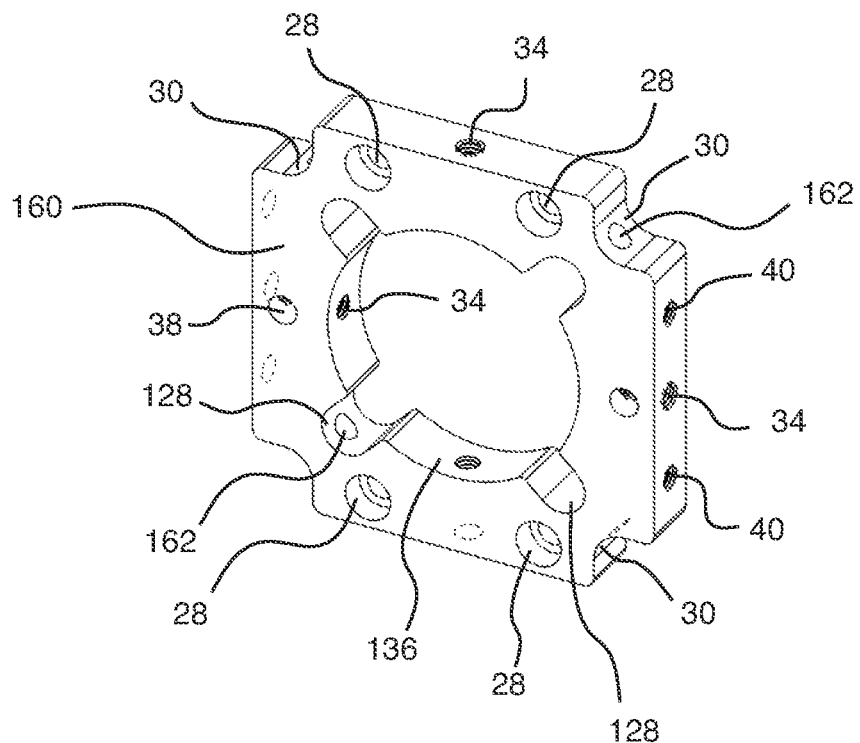
FIG. 19 is a detail perspective view of an alternate optical mounting plate in accordance with the invention to accept inner, and outer support rods.
Figure 20:
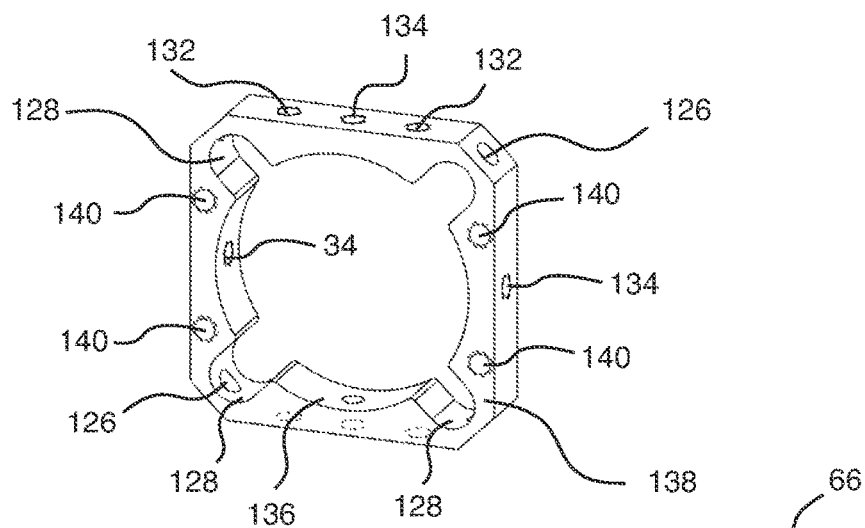
FIG. 20 is a detail perspective view of an optical mounting plate to mate with the mount shown in FIG. 16.
Figure 21:
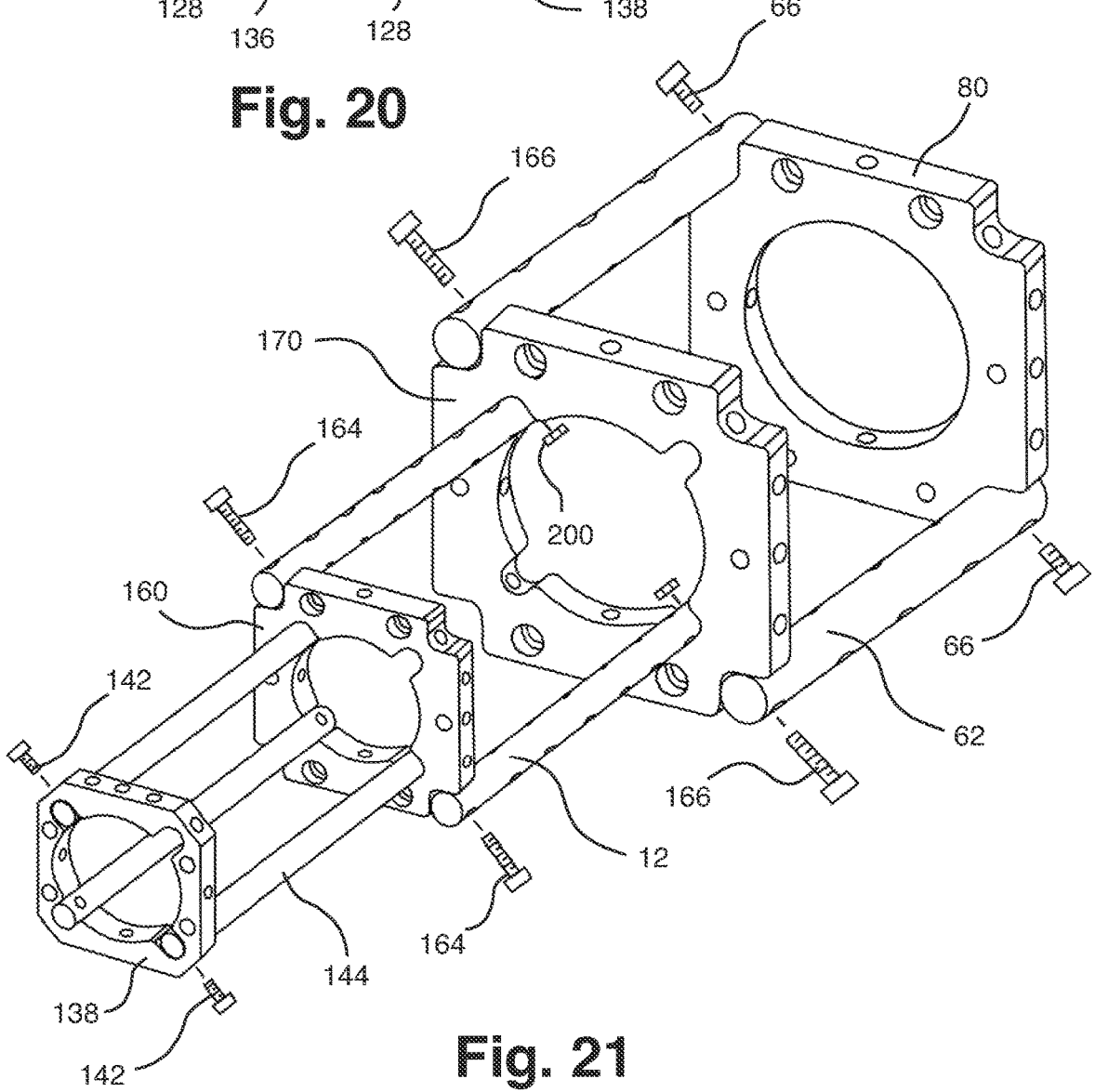
FIG. 21 is a detail perspective view of an optical assembly combining mounting plates adapted to accept inner, and outer rods.

FIG. 19 depicts an optical mount 160 which combines the external rod accepting concavities 30 of mounting plate 158 in FIG. 18, with the internal rod mounting concavities 128 of mounting plate 124 in FIG. 16. In accordance with the invention, FIG. 21 shows how two rods are secured to mount 160's internal concavity 128, and external concavity 30, utilizing a long screw 164 to clamp the two rods together through unthreaded bore 162 (FIG. 19). FIG. 21 further illustrates how different sized mounts 170 and 160 may be secured together by the same method. An application of this arrangement would be in constructing astronomical telescopes. Because rods 144 have threaded mounting bores 146 (FIG. 17), fastening screws 164 can be directly secured onto these rods. For larger mounts, however, each mounting screw 166 passing through unthreaded bores of rod 62, and unthreaded bores of smaller rod 12, would require a locking nut 182 for clamping the two rods towards each other.

Figure 22:
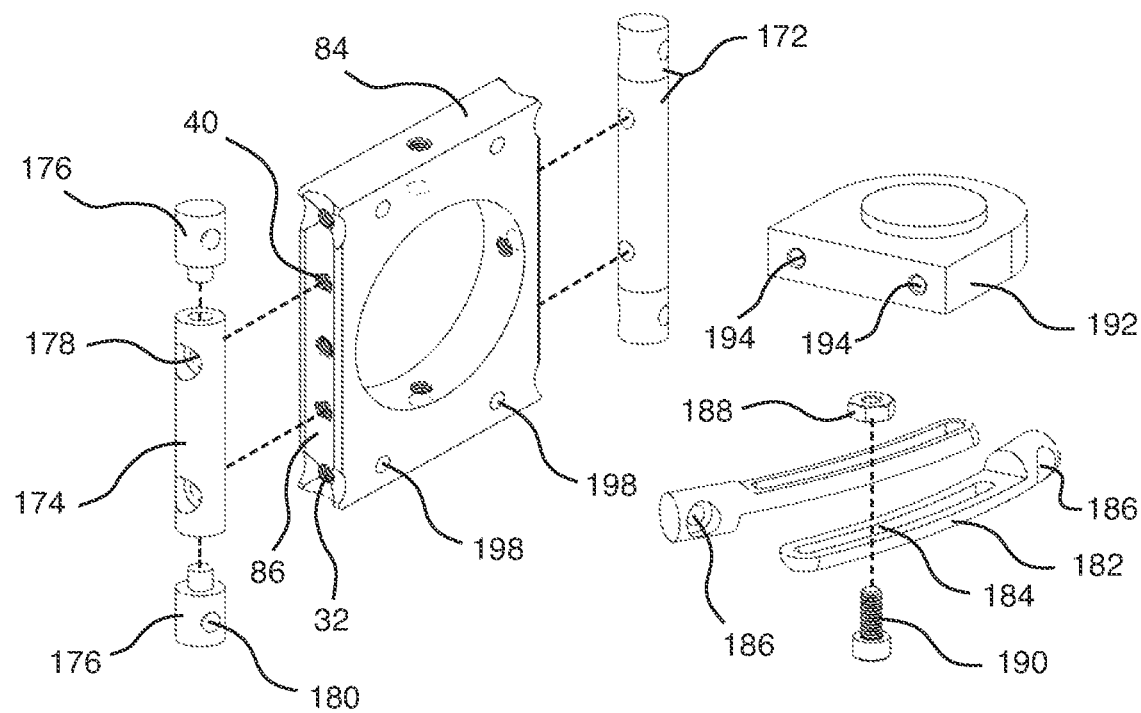
FIG. 22 is a detail perspective view of components for a hinged corner connector to allow bending of optical axis, and to lock it in place.

FIG. 22 displays a hinged connector 172 designed to work in combination with said mounting plate 84 to allow bending of light path in optical assemblies. The hinged connector 172 consists of two revolving pins 176 riding on both ends of pivot support 174 secured to mounting plates 84. FIG. 23 shows how a paired combination of two hinged connectors 172, and three mounting plates 84, could join two optical axis, and allow them to rotate about the optical center of a prism 196. The pivot angle between the two optical axis may be locked using swivel arms 182 that are coupled together with a lock screw 190, and locking nut 188. The lock screw rides on slots 184, that may be unlocked as needed to allow further angular adjustment.

FIG. 23 also displays a sliding connector 94 that allows optical mount 10 to be secured in between bores 54 along the rods. As it was explained earlier in FIG. 1, optical components may be freely positioned within the mounting plates utilizing an extension ring 42 as needed. In case the mounting plate itself must be displaced along the rods, a sliding connector 96 can be employed. As illustrated in FIG. 23, plate securing screw 18 rides inside slot 100 along the elongated concavity 98 of sliding connector 94, and may be locked in place by locking nut 202.

FIG. 23 illustrates a typical laboratory arrangement for a spectroscope, but is also a good representation of how such assemblies can be put aside as an off the shelf module for building further setups. The high cost and thicker size of mounting plates in prior art prevents them to be arranged as modules. Through the lower cost, and more compact geometry of mounting plates in current invention, it would be possible to work with preassembled modules and avoid meticulous assembly practices using dispersed hardware.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

I claim:

1. An optical cage set, comprising:
    fasteners;
    support rods, at least one support rod thereof comprising one or more rod apertures, at least one rod aperture thereof configured to receive at least one fastener of the fasteners; and
    a first optical mounting plate connectable to an optical element defining an optical axis oriented in an axial direction, the first optical mounting plate including:
        concavities, at least one concavity thereof configured to receive the at least one support rod, and
        one or more plate apertures, at least one plate aperture thereof extending into the at least one concavity and configured to receive the at least one fastener such that the at least one fastener secures the at least one support rod to the first optical mounting plate by extending through the at least one rod aperture and into the at least one plate aperture.

2. The optical cage set of claim 1, wherein the at least one concavity is configured to receive the at least one support rod such that the at least one support rod extends in the axial direction.

3. The optical cage set of claim 1, wherein a first rod aperture of the one or more rod apertures comprises threads.

4. The optical cage set of claim 1, wherein the at least one rod aperture comprises a counter-bore.

5. The optical cage set of claim 1, comprising:
    a mount having inside concavities and outside concavities, wherein the inside concavities are configured to receive first support rods of the support rods each defining a first diameter and the outside concavities are configured to receive second support rods of the support rods each defining a second diameter larger than the first diameter.

6. The optical cage set of claim 1, wherein the concavities are configured to receive the support rods such that the support rods extend orthogonally in relation to the axial direction.

7. The optical cage set of claim 1, wherein the concavities include:
    first concavities configured to receive first support rods of the support rods such that the first support rods extend in the axial direction; and
    second concavities configured to receive second support rods of the support rods such that the second support rods extend orthogonally in relation to the axial direction.

8. The optical cage set of claim 1, wherein the first optical mounting plate includes open apertures, each open aperture thereof being slotted and comprising a counter-bore.

9. The optical cage set of claim 1, comprising:
    a second optical mounting plate including internal concavities, at least one internal concavity thereof configured to receive the at least one support rod such that the first optical mounting plate is connectable to the second optical mounting plate via the at least one support rod.

10. The optical cage set of claim 1, wherein the one or more rod apertures of the at least one support rod comprise:
    at least one first rod aperture and at least one second rod aperture;
    the at least one first rod aperture oriented in orthogonal relation to the at least one second rod aperture;

the at least one first rod aperture being configured to receive a first fastener of the fasteners; and the at least one second rod aperture being configured to receive a second fastener of the fasteners.

11. The optical cage set of claim 1, wherein the first optical mounting plate includes counter-bores extending in the axial direction, the counter-bores being configured to receive first fasteners of the fasteners to facilitate connection of a second optical mounting plate to the first optical mounting plate in face-to-face relation.

12. The optical cage set of claim 1, wherein the one or more plate apertures comprises a first plate aperture extending orthogonally in relation to the axial direction, the first plate aperture being configured to receive a first fastener of the fasteners to facilitate connection of a second optical mounting plate to the first optical mounting plate in orthogonal relation.

13. The optical cage set of claim 1, wherein the first optical mounting plate includes a polygonal configuration.

14. An optical cage set, comprising:
fastening screws comprising first fastening screws and second fastening screws;
support rods including a plurality of bores configured to receive the fastening screws, the support rods comprising first support rods and second support rods;
a first optical mounting plate connectable to a first optical element defining a first optical axis oriented in a first axial direction, the first optical mounting plate including:
first concavities configured to receive the first support rods such that the first support rods extend in the first axial direction, and
first bores extending into the first concavities and configured to receive the first fastening screws such that the first fastening screws secure the first support rods and connect the first support rods to the first optical mounting plate; and
a second optical mounting plate connectable to a second optical element defining a second optical axis oriented in a second axial direction, the second optical mounting plate including:
second concavities configured to receive the second support rods such that the second support rods extend orthogonally in relation to the second axial direction, and
second bores extending into the second concavities and configured to receive the second fastening screws such that the second fastening screws secure the second support rods and connect the second support rods to the second optical mounting plate.

15. The optical cage set of claim 14, comprising:
a plurality of optical elements supported between the support rods.

16. The optical cage set of claim 14, wherein at least one of the first optical mounting plate or the second optical mounting plate includes open apertures, each open aperture thereof being slotted and comprising a counter-bore.

17. The optical cage set of claim 14, wherein the first optical mounting plate and the second optical mounting plate each include a polygonal configuration.

18. The optical cage set of claim 14, comprising:
a third optical mounting plate connectable to a third optical element defining a third optical axis oriented in a third axial direction, the third optical mounting plate including:
third concavities configured to receive third support rods of the support rods such that the third support rods extend in the third axial direction, and
fourth concavities configured to receive fourth support rods of the support rods such that the fourth support rods extend orthogonally in relation to the third axial direction.

19. A system, comprising:
fasteners;
support rods; and
two or more optical mounting plates configured to couple to an optical element defining an optical axis, first and second optical mounting plates of the two or more optical mounting plates each including:
concavities, at least one concavity thereof configured to receive at least one support rod of the support rods, and
one or more plate apertures, at least one plate aperture thereof extending into the at least one concavity and configured to receive at least one fastener of the fasteners such that the at least one fastener secures the at least one support rod within the at least one concavity by extending through a rod aperture in the at least one support rod and into the at least one plate aperture.

20. The system of claim 19, wherein a first subset of the support rods extend parallel to the optical axis and a second subset of the support rods extends orthogonal to the optical axis.

* * * * *